G. M. STIVERS.
ARMORED PNEUMATIC TIRE.
APPLICATION FILED JAN. 18, 1921.

1,399,324.

Patented Dec. 6, 1921.

WITNESSES
George G. Myers

INVENTOR
George M. Stivers,
BY
ATTORNEYS

UNITED STATES PATENT OFFICE.

GEORGE M. STIVERS, OF DIXON, CALIFORNIA.

ARMORED PNEUMATIC TIRE.

1,399,324. Specification of Letters Patent. Patented Dec. 6, 1921.

Application filed January 18, 1921. Serial No. 438,149.

*To all whom it may concern:*

Be it known that I, GEORGE M. STIVERS, a citizen of the United States, and a resident of Dixon, in the county of Solano and State of California, have invented certain new and useful Improvements in Armored Pneumatic Tires, of which the following is a specification.

My present invention relates generally to armored pneumatic tires, and more particularly to an armor construction involving readily renewable or replaceable elements capable of forming a non-skid surface.

The object of my present invention is the provision of an armor arrangement which may be readily adapted to and removed from a pneumatic tire, which includes readily removable and renewable tractive elements, which will be simple and inexpensive and which will be durable and efficient in use.

Figure 1:
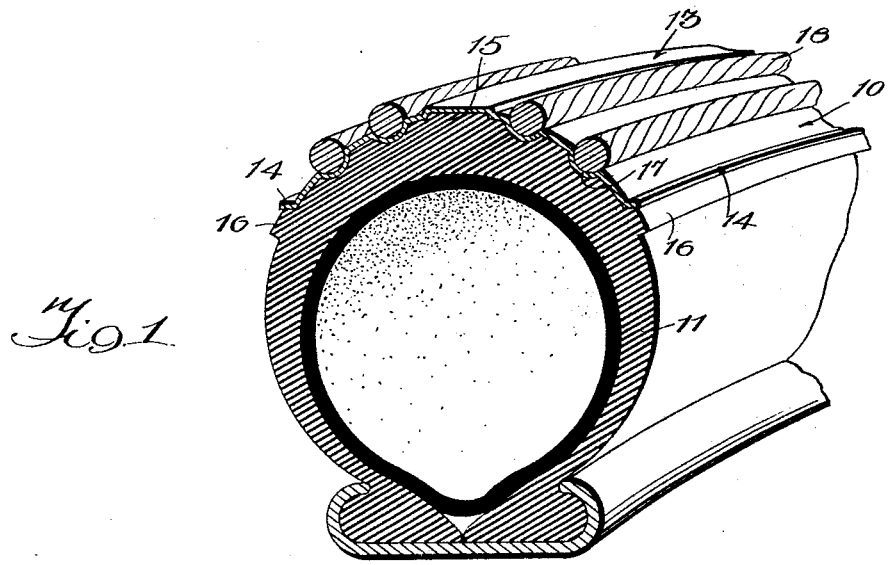
Figure 2:
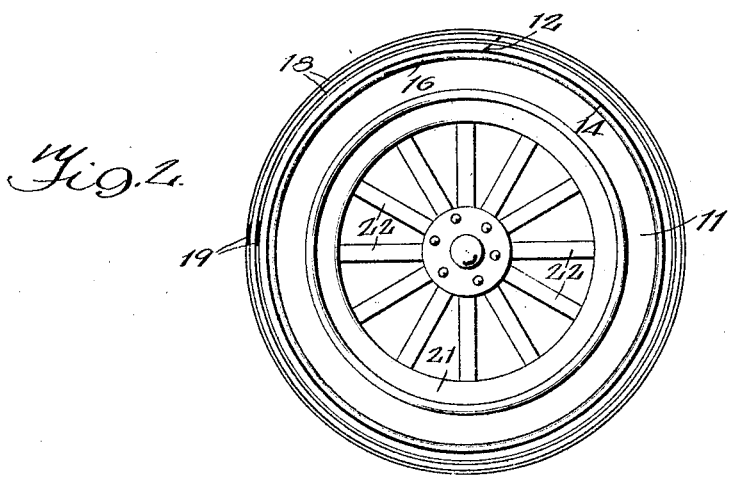
Figure 3:
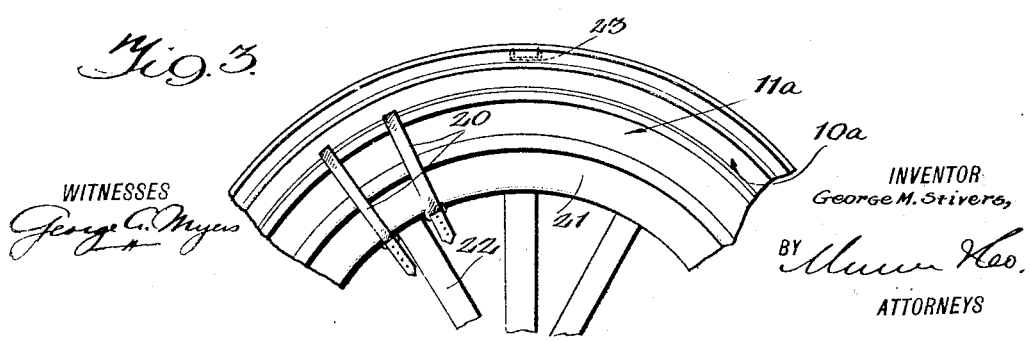

In the accompanying drawing which illustrates my present invention and forms a part of this specification, Figure 1 is a fragmentary perspective view through a portion of a tire equipped with my present invention, Fig. 2 is a side elevation complete showing the practical application of my invention, and Fig. 3 is a partial side view illustrating a slight modification.

Referring now to these figures, my invention proposes the use of a metallic shield 10 disposed circumferentially around the tread portion of a pneumatic tire 11, with beveled ends at 12 in order that the peripheral shield may be readily placed upon and removed from the tire when the latter is deflated.

The shield is preferably provided along its median line with an outwardly pressed rib 13, forming an inner channel, and has outstanding side flanges 14 around its opposite edges.

To coöperate with the rib 13 and side flanges 14, the tire casing preferably has a median rib 15 and side ribs 16, the former projecting into the inner groove formed by the rib 13 of the shield, and the latter receiving thereagainst the flanges 14.

In addition to its rib 13 and side flanges 14, which coöperate with the above structure of the tire to prevent lateral displacement, the shield 10 has inwardly pressed ribs 17 forming external circumferential grooves in which circular cables 18 are seated. These grooves and cables are preferably located upon opposite sides of and equi-distantly spaced from the median rib 13 of the shield and may be in any suitable number so arranged that the inner pair at least, considering also the diameter of the cables, will be disposed with their outer peripheries projecting beyond the periphery of the median rib 13 of the shield and thus form the tractive surface of the tire and its armor.

In case more than a single pair of cables are utilized as I have illustrated, the outer cables, or those nearest the side flanges 14 may either be disposed to coöperate with the inner cables in forming the tractive surface, or may normally remain inactive and adapted to function only in case of side slip.

The cables are of course subject to wear in use but are readily renewable by simply deflating the tire in order that they may be withdrawn and others inserted, and it is quite obvious that being either of endless form or with their ends spliced, welded or otherwise joined as at 19 in Fig. 2, these cables will be drawn tightly into the external grooves of the shield when the tire is air filled and expanded to the normal state of use.

It becomes quite obvious therefore that my invention provides an armor including a shield along with such means as not only serve as an additional anchor for the shield to hold the latter in place but which act to prevent wear of the shield so that the latter with proper attention is not subject to wear, and which also function as an anti-skid.

While I contemplate the support of the shield upon a tire through the natural expansion and pressure of the tire itself, it may be desired to connect the shield upon a tire in such a way as to avoid danger of accidental displacement in case of side blowouts as well as to prevent circumferential creeping, and this may be done by straps or like fastening members 20 as shown in Fig. 3, leading from the side flanges of the shield inwardly around the rim 21 of a wheel, and located upon opposite sides for instance of a spoke 22. This may also be done by providing the tire 11ª of Fig. 3 with a small depression or recess and similarly providing the armor or shield 10ª with a projection to interfit the recess in order to defeat circumferential shifting, these coacting recesses and projections being indicated in dotted lines at 23 in Fig. 3 and being located in practice diametrically opposite the split ends of the shield.

I claim:

1. The combination with a tire having a median rib and side ribs, of a split circumferential shield having an inner groove to receive the median rib of the tire and having side flanges abutting the side ribs of the tire, said shield having external circumferential grooves upon opposite sides of its median line, and endless cables detachably seated and normally held within said grooves by the pressure of the tire.

2. The combination with a tire having a median rib and side ribs, of a split circumferential shield having an inner groove to receive the median rib of the tire and having side flanges abutting the side ribs of the tire, said shield having external circumferential grooves upon opposite sides of its median line, and endless cables detachably seated and normally held within said grooves by the pressure of the tire, said cables projecting beyond the outermost limits of the shield and forming a readily renewable tractive surface as described.

GEORGE M. STIVERS.